350-389 SR CROSS REFERENCE SEARCH ROOM
XR 3,374,473

March [illegible] S. E. CUMMINS 3,374,473

BISTABLE OPTICALLY READ FERROELECTRIC MEMORY DEVICE

Filed April 12, 1967 5 Sheets-Sheet 1

INVENTOR.
S. E. CUMMINS
BY Harry A. Herbert Jr
ATTORNEY
James S. Shannon
AGENT

3374473
OR IN 365/122

BISTABLE OPTICALLY READ FERROELECTRIC MEMORY DEVICE

Filed April 12, 1967 5 Sheets-Sheet 2

INVENTOR.
S. E. CUMMINS
BY Harry A. Herbert Jr
ATTORNEY
James S. Shannon
AGENT

BISTABLE OPTICALLY READ FERROELECTRIC MEMORY DEVICE

Filed April 12, 1967 5 Sheets-Sheet 3

INVENTOR.
S. E. CUMMINS
BY Harry A. Herbert Jr
ATTORNEY
James S. Shannon
AGENT

BISTABLE OPTICALLY READ FERROELECTRIC MEMORY DEVICE

Filed April 12, 1967 5 Sheets-Sheet 4

INVENTOR.
S. E. CUMMINS
BY Harry A. Herbert Jr
ATTORNEY
James S. Shannon
AGENT

INVENTOR.
S. E. CUMMINS
BY Harry A. Herbert Jr
ATTORNEY
James S. Shannon
AGENT 3,374,473

BISTABLE OPTICALLY READ FERROELECTRIC MEMORY DEVICE

Stewart E. Cummins, 405 Funston Ave., New Carlisle, Ohio 45344

Filed Apr. 12, 1967, Ser. No. 630,469
12 Claims. (Cl. 340—173.2)

ABSTRACT OF THE DISCLOSURE

A bistable optically read memory device comprising a crystal of ferroelectric bismuth titanate ($Bi_4Ti_3O_{12}$) between crossed polarizers. The spontaneous polarization vector of this monoclinic crystal can be switched between two stable directions about 10° apart, with an accompanying switching of the optical indicatrix between two stable angular positions about the crystallographic *b* axis, by the momentary application of an electric field normal to the *a-b* plane. Nondestructive optical read-out is accomplished between crossed polarizers with the crystal oriented for extinction in one of the two stable positions of the indicatrix. Applications are shown to multicell memories with optical access and sensing for read-out and with either coincident pulse or optical access for write-in, to display panels, and to logic circuits.

The invention described herein may be manufactured and used by or for the United States Government for governmental purposes without the payment to me of any royalty thereon.

*Background of the invention*

The invention relates to ferroelectric information storage devices.

While the use of ferroelectric crystals for the storage of binary information is known in the art, its practical application has had a number of disadvantages. In such devices the information is stored as one of two remanent polarizations of opposite sign between which the crystal can be switched by the momentary application of an electric field. One of the principal disadvantages of these devices is the difficulty in determining the sign of the remanent polarization in order to read the information stored. Further, it is desirable to be able to read the memory element nondestructively, which increases the difficulty. Electrical read-out is complicated by the fact that the ferroelectric element is only a two-terminal device. Optical read-out of the stable remanent polarization state has not been possible since in crystals heretofore used the optical properties of the crystal have been the same in the two stable polarization states. A method of optical read-out based on optically detecting the temporary strain induced birefringence that exists in the crystal during the period when it is in the process of being switched between the two stable polarization states is disclosed in U.S. Patent No. 2,928,075 to J. R. Anderson. However, this method is destructive of the stored information, which complicates the overall memory system. Both piezoelectric (U.S. Patent No. 2,782,397 to D. R. Young) and pyroelectric (A. G. Chynoweth, J. Applied Physics 27, 78 (1956)) sensing methods have been proposed for nondestructive read-out of ferroelectric memories. However, these methods present problems involved with circuit complexities, mechanical fatigue effects and speed limitations.

*Summary of the invention*

The invention is a ferroelectric memory cell capable of electrical write-in and nondestructive optical read-out. It is based upon my discovery that ferroelectric bismuth titanate ($Bi_4Ti_3O_{12}$) has two stable polarization states between which the crystal can be switched by the momentary application of an electric field and in which the optical properties of the crystal are different enough to permit differentiation of the two states by simple optical means.

*Description of the preferred embodiments*

Figures 1, 2, 3, 4, 5:
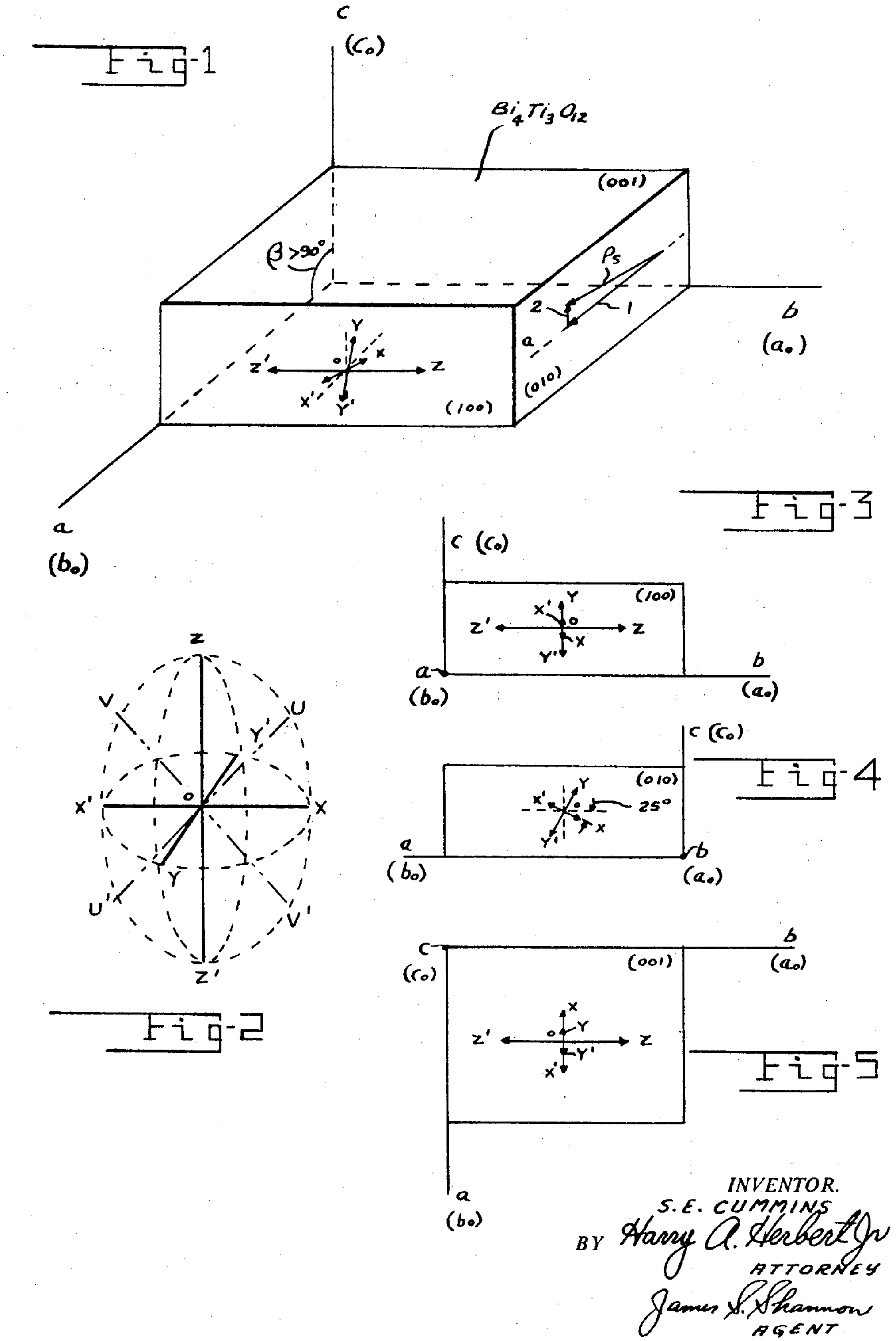
FIG. 1 shows a crystal of $Bi_4Ti_3O_{12}$ together with the crystallographic axes, the spontaneous polarization vector and the optical indicatrix.
FIG. 2 shows the general form of the optical indicatrix of a biaxial crystal such as $Bi_4Ti_3O_{12}$.
FIGS. 3, 4 and 5 show projection of the indicatrix for the purpose of displaying more clearly its relationship to the crystallographic axes.

FIG. 1 illustrates a single crystal of $Bi_4Ti_3O_{12}$ and the crystallographic axes. Investigators who have conducted X-ray and electrical studies of this material have concluded that it falls in the orthorhombic crystal system. However, the observation of ferroelectric domains when viewed between crossed polarizers with the light 10 to 15 degrees from the normal to the major surface of the crystal, as reported in my paper entitled Ferroelectric Domains in $Bi_4Ti_3O_{12}$ Single Crystals, Journal of Applied Physics, vol. 37, No. 6, 2510, May 1966, indicates a tilting of the optical indicatrix which is not consistent with orthorhombic symmetry where the axes of the indicatrix are parallel to the crystallographic axes. This has led to further optical and electrical investigation of the material, particularly with the light parallel to the major crystal surface, which has confirmed the tilt of the indicatrix about the *b* axis and has led to the conclusion that $Bi_4Ti_3O_{12}$ belongs to the monoclinic system, point group *m*.

In accordance with the above, *a*, *b* and *c* in FIG. 1 represent the monoclinic crystal axes. As well understood in the art, these axes only represent directions and their point of intersection may be any point in the crystal. In the monoclinic system the positive *a* and *c* axes intersect at an angle $\beta > 90°$ and the *b* axis is normal to the plane of the *a* and *c* axes. In the orthorhombic system the three axes are mutually perpendicular. Since the angle $\beta$ in $Bi_4Ti_3O_{12}$ is very nearly equal to 90° this material for most practical purposes may be considered orthorhombic and therefore the pseudo-orthorhombic axes $a_0$, $b_0$ and $c_0$ are shown in parentheses in FIG. 1.

The essentially two-dimensional growth habit of bismuth titanate results in thin, mica-like crystals. A major surface, which is parallel to the *ab* plane, is designated by the Miller indices (001) in FIG. 1 and the crystal may be grown with this surface of almost any desired dimensions. Thicknesses in the *c* direction range from 0.1 to 0.25 mm. Optical investigations with the light directions parallel to the *a* and *b* axes may be facilitated by cementing the major surfaces of the crystal between thin glass plates and grinding flat surfaces on the sandwich normal to the major surfaces and the two axes. Thin metallic electrodes may be evaporated onto the opposite major surfaces before cementing between the glass plates to permit the application of an electric field normal to the *a-b* plane.

The spontaneous polarization of the ferroelectric crystal in FIG. 1 may be represented by the vector $P_s$ which is parallel to the *ac* plane and makes an angle of about 5° with the *a* axis. This polarization, which has a magnitude not less than 30 $\mu$c./cm.$^2$, may be resolved into a component 1 parallel to the *a* axis and a component 2, having a magnitude of about 4 $\mu$c./cm.$^2$, normal to the *a-b* plane. If electrodes are placed on the major faces of the crystal, i.e. the (001) surfaces, for the momentary application of an electric field normal to the *a-b* plane the ferroelectric polarization component 2 may be reversed and will remain in the reversed state after removal of the field. Therefore, by the application of voltage pulses across the major faces that alternate in polarity, the polarization vector $P_s$ can be rocked between two stable directions about 10° apart through successive reversals of its component 2.

I have discovered that the above-described rocking of the polarization vector is accompanied by a corresponding rocking of the optical indicatrix of the crystal about the *b* axis between two stable angular positions. As shown in FIG. 2, the general form of the optical indicatrix of a biaxial crystal such as $Bi_4Ti_3O_{12}$ is a triaxial ellipsoid for which OX, OY and OZ are the three mutually perpendicular semiaxes intersecting at point O. As in the case of the crystallographic axes, the point O may be any point in the crystal. A description of the optical indicatrix may be found in standard reference works on crystallography, for example, Optical Crystallography, Wahlstrom, 3rd edition, John Wiley and Sons. Briefly, for any given wave length of light, the biaxial indicatrix gives by the lengths of the semiaxes the three principal indices of refraction of the biaxial crystal and the directions of light vibration for which each obtains. Thus, the largest of the three semiaxes OZ represents the direction of light vibration in the crystal for which the index of refraction is the largest; the smallest of the three semiaxes OX represents the direction of light vibration for which the index of refraction is the smallest; and the third semiaxis OY, having a length intermediate the lengths of OZ and OX, represents the index of refraction for light vibrating in a direction normal to OZ and OX. Light passing through the point O in any direction, with the exception of two special directions, is split into two beams vibrating respectively in the directions of the two semiaxes of the elliptical section of the indicatrix formed by a plane passing through O normal to the light propagation direction. These semiaxes represent by their lengths the indices of refraction for the two beams and since these lengths are unequal the indices of refraction are unequal and the two beams travel through the crystal with different velocities. In the case of two directions through point O, such as UU′ and VV′ in FIG. 2, which lie in the plane XOZ and are equally inclined to the ZZ′ axis, the sections of the indicatrix are circles so that the semiaxes are equal and the index of refraction of the crystal and the velocity of propagation are the same for all directions of vibration of the light. These two special directions are the two optic axes of the biaxial crystal.

The directions of the axes of the indicatrix through a point O in a crystal of $Bi_4Ti_3O_{12}$ are shown in FIG. 1 and, somewhat more clearly, in FIGS. 3, 4 and 5 where the projections of these axes on the (100), (010) and (001) surfaces, respectively, are given. When a crystal is optically examined between crossed polarizers, as in a polarizing microscope, extinction of the light occurs whenever the axes of the indicatrix are parallel to the directions of the polarizers. By noting the positions of the crystal faces or axes relative to the polarization directions when extinction occurs, it has been determined that in $Bi_4Ti_3O_{12}$ the ZZ′ axis of the indicatrix is parallel to the *b* axis of the crystal, while the XX′ and YY′ axes are inclined to the *a* axis by about 25° and 65°, respectively.

Figures 6, 7:
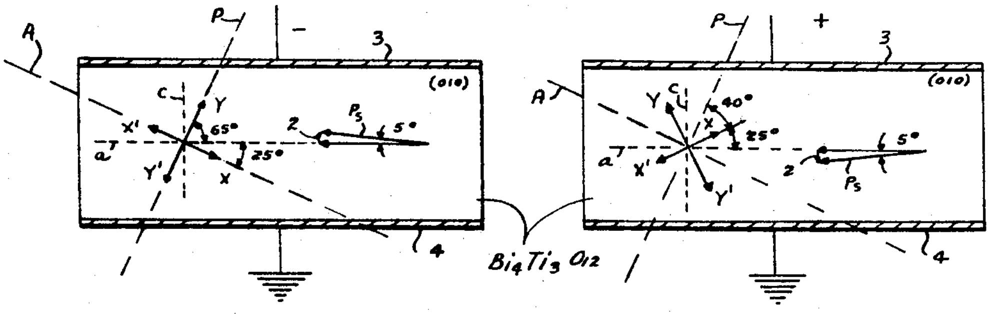
FIGS. 6 and 7 show the two stable states of the indicatrix utilized in the described memory device.
Figure 8:
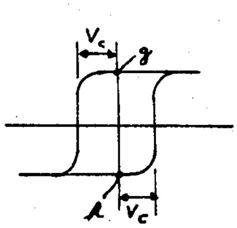
FIG. 8 shows the hysteresis exhibited in switching between the two states of FIGS. 6 and 7.

As stated earlier, rocking the polarization vector by reversing its component 2 is accompanied by a corresponding rocking of the indicatrix about the *b* axis of the crystal. This is illustrated in FIGS. 6 and 7 which show two stable polarization states of the crystal. As seen in these figures the two states are characterized by equal and opposite angular displacements of the spontaneous polarization vector $P_s$ from the *a* axis direction, and equal and opposite angular displacements of the indicatrix about the *b* axis from the *a* axis direction. The rotations from the axial directions are of about 5° and 25°, respectively. Either of the conditions shown in FIGS. 6 and 7 may be switched to the other by the momentary application of a voltage pulse of the proper magnitude between electrodes 3 and 4, applied to the major or (001) faces of the crystal, and will remain in the state to which switched after removal of the switching voltage and until switched back to the previous state by a pulse of opposite polarity. Switching between the two polarization states exhibits a well formed hysteresis loop such as shown in FIG. 8. One of the stable states of the crystal may be represented by point *g* on the hysteresis loop and the other by point *h*. Switching between the two requires a voltage pulse exceeding the coercive voltage $V_c$.

Figure 9:
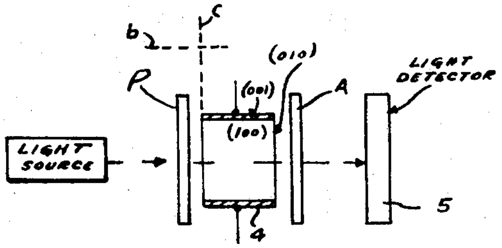
FIG. 9 shows one form of the basic memory cell with the light directed along the *b* axis.
Figure 10:
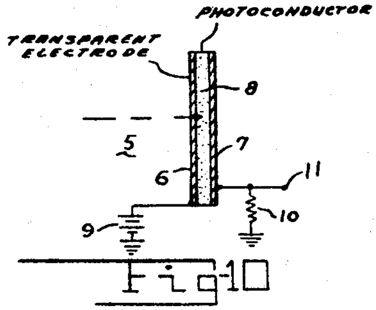
FIG. 10 shows a suitable optical detector for use in FIG. 9.

FIGS. 6 and 7 also illustrate how the crystal may be used as a bistable storage device or memory cell for binary information. For instance, binary "0" may be represented by the stable state illustrated in FIG. 6 and binary "1" may be represented by the stable state illustrated in FIG. 7. This information may be read by placing the crystal in parallel light between crossed polarizers P and A as shown in FIG. 9. For the "0" state shown in FIG. 6, the crystal may be oriented relative to the crossed polarizer directions, designated P and A, to an extinction position, i.e. a position where the indicatrix axes X–X′ and Y–Y′ are parallel to the directions P and A. For light parallel to the *b* axis, extinction occurs in the "0" state when *a* and *c* axes of the crystal make an angle of approximately 25° with the directions P and A. For the "1" state of FIG. 7, however, the indicatrix, as already noted, has an angular position about the *b* axis of the crystal that is approximately 50° counterclockwise of its position in the "0" state and, for light parallel to the *b* axis, the crystal is about 40° from the nearest extinction position, or position in which the indicatrix axes are parallel to P and A. Consequently, light is blocked by the crystal and crossed polarizer combination in the "0" state and passed in the "1" state to a suitable light detector 5, permitting the binary information stored in the crystal to be easily read by optical means. FIG. 10 illustrates an acceptable light detector 5 in which a transparent electrode 6 and an opaque electrode 7 connect a photoconductive layer 8 in series between source 9 and load resistor 10. Light passing through electrode 6 causes a current flow through 10 and an output signal voltage at terminal 11.

Figure 11:
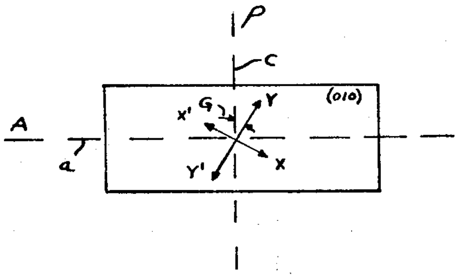
FIGS. 11, 12 and 13 show the dependence of the extinction angle of the crystal upon the angle between light direction and the *b* axis.
Figure 12:
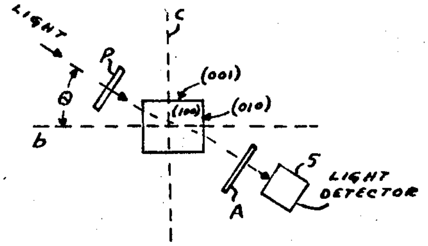
Figure 13:
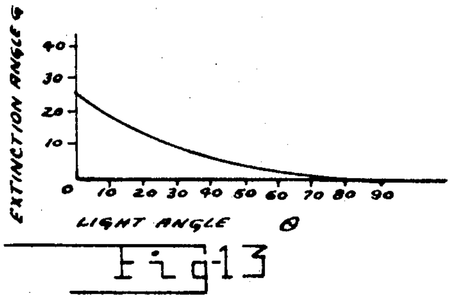

It is not necessary that the incident light be parallel to the *b* axis in order to sense the two states in FIGS. 6 and 7, although light in this direction provides the greatest separation, approximately 40°, of the extinction positions of the crystal in the two states as well as the largest extinction angle G (FIG. 11), approximately 25°, in either state. The extinction angle G is defined as the minimum angle through which the crystal must be rotated from a position where its axes are parallel to the polarization directions P and A to achieve extinction. For light normal to the *a* axis, the angle G is inversely related to the angle $\theta$ (FIG. 12) which the light direction makes with the *b* axis, as shown in FIG. 13. For $\theta=0$, the condition existing in FIGS. 6, 7 and 9, the extinction angle is approximately 25°. As $\theta$ increases the extinction angle decreases until it becomes zero for $\theta=90°$, or a light direction normal to the major (001) face of the crystal.

Figure 14:
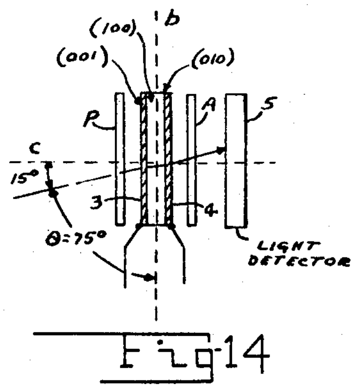
FIG. 14 shows the basic memory cell with the light direction at an angle of 75° to the *b* axis.

The largest value of $\theta$ for which the two positions of the indicatrix can be reliably differentiated by optical means is about 75°. FIG. 14 illustrates the arrangement of a memory cell read under this condition. In this case the electrodes 3 and 4 must be transparent metallic films since the light impinges on the major (001) surface of the crystal to which the electrodes are applied. As before, the light direction is normal to the *a* axis. With $\theta=75°$, or the light direction 15° from the normal to the major crystal surface, the difference in the extinction angles for the two stable positions of the indicatrix is about 2°. The smallness of this difference is caused in part by the fact that, due to refraction, the light within the crystal is not 15° from the normal direction but only about 6°.

Figures 15, 24:
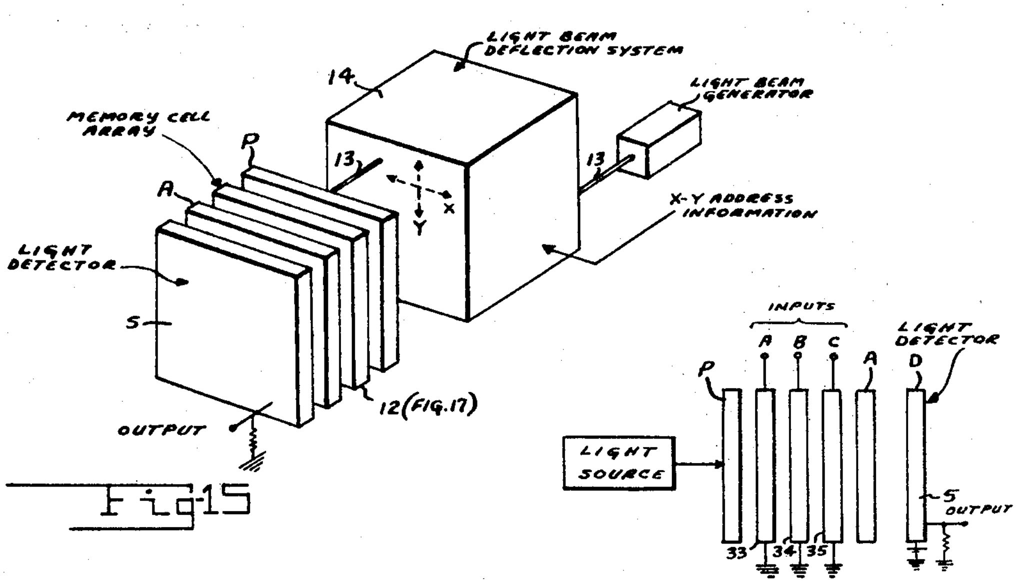
FIG. 15 shows the general arrangement of a multicell memory with the light parallel to the *b* axis of the crystal as in FIG. 9.
FIG. 24 shows the application of $Bi_4Ti_3O_{12}$ memory cells to logic circuits.
Figure 16:
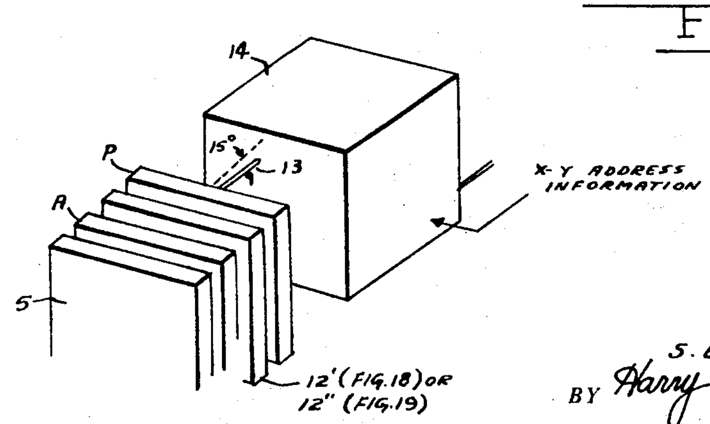
FIG. 16 shows the general arrangement of a multicell memory with the light at an angle of 75° to the *b* axis as in FIG. 14.

The basic memory cells shown in FIGS. 9 and 14 may be arranged in arrays to form multicell memories. The general arrangements of the memories are shown in FIGS. 15 and 16. The array 12 is arranged between a polarizer P and an analyzer A having their direction of polarization at right angles. The cells of the array are arranged in columns and rows in X–Y coordinate fashion. A light beam 13 for reading the various memory cells of the array may be positioned on any cell while maintaining a position normal to the array by a light beam deflection system 14. The details of the beam deflection system are not part of the invention and any suitable system for accomplishing the desired result may be employed. Depending upon the access rate required, the deflection system may range from a simple mechanical X–Y positioning device for the lower rates to electro-optical digital light deflectors, such as described, for example, in an article entitled Convergent Beam Digital Light Deflector, by Kulcke, Kosanke, Max, Fleisher and Harris, starting on page 371 in Optical and Electro-Optical Information Processing, the Massachusetts Institute of Technology Press, Cambridge, Mass., copyright 1965, for the highest rates. The light detector 5 may be as shown in FIG. 10.

Figure 17:
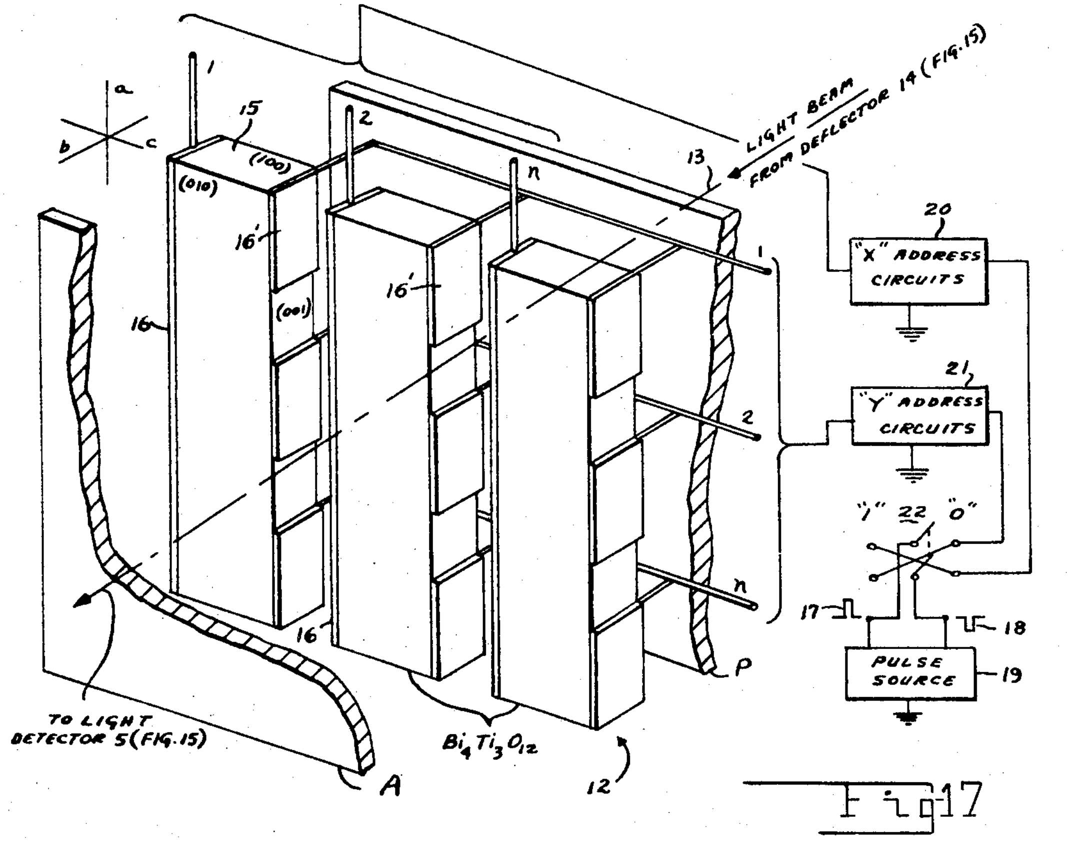
FIG. 17 shows the construction details of the array 12 in FIG. 15.

In the array 12 of FIG. 15 the crystals forming the individual cells are oriented as shown in FIG. 9. The details of this array are shown in FIG. 17. Crystal strips 15 are cut parallel to the *a* axis with faces normal to the *b* axis, these strips forming the columns of the array. A continuous electrode 16 is applied to one of the major (001) faces of each crystal strip and individual small electrodes 16' are applied to the other (001) face, the small electrodes dividing the columns into rows of memory cells. With this arrangement each cell has X and Y addresses where X is the column and Y the row. Write-in is accomplished by applying voltage pulses 17 and 18 of opposite polarity from source 19 to the proper cell as selected by the X and Y address circuits 20 and 21. By making the voltage pulses each somewhat less than the coercive voltage $V_c$, FIG. 8, only the cell where pulse coincidence occurs is switched. The position of polarity reversing switch 22, or its electrical equivalent, determines which of its two stable states, shown in FIGS. 6 and 7, the cell will assume and whether a "1" or a "0" will be stored.

Optical read-out of the individual cells in the array of FIG. 17 is accomplished in the manner explained for FIGS. 6 and 7. The light beam 13 in this case is parallel to the *b* axis, i.e., $\theta$, as defined in FIG. 12, is zero. X and Y address information is applied to beam deflector 14 to position the beam for read-out of the desired memory element. The presence or absence of transmitted light, which indicates the state of the cell, is determined by light detector 5.

Figures 18, 19, 22:
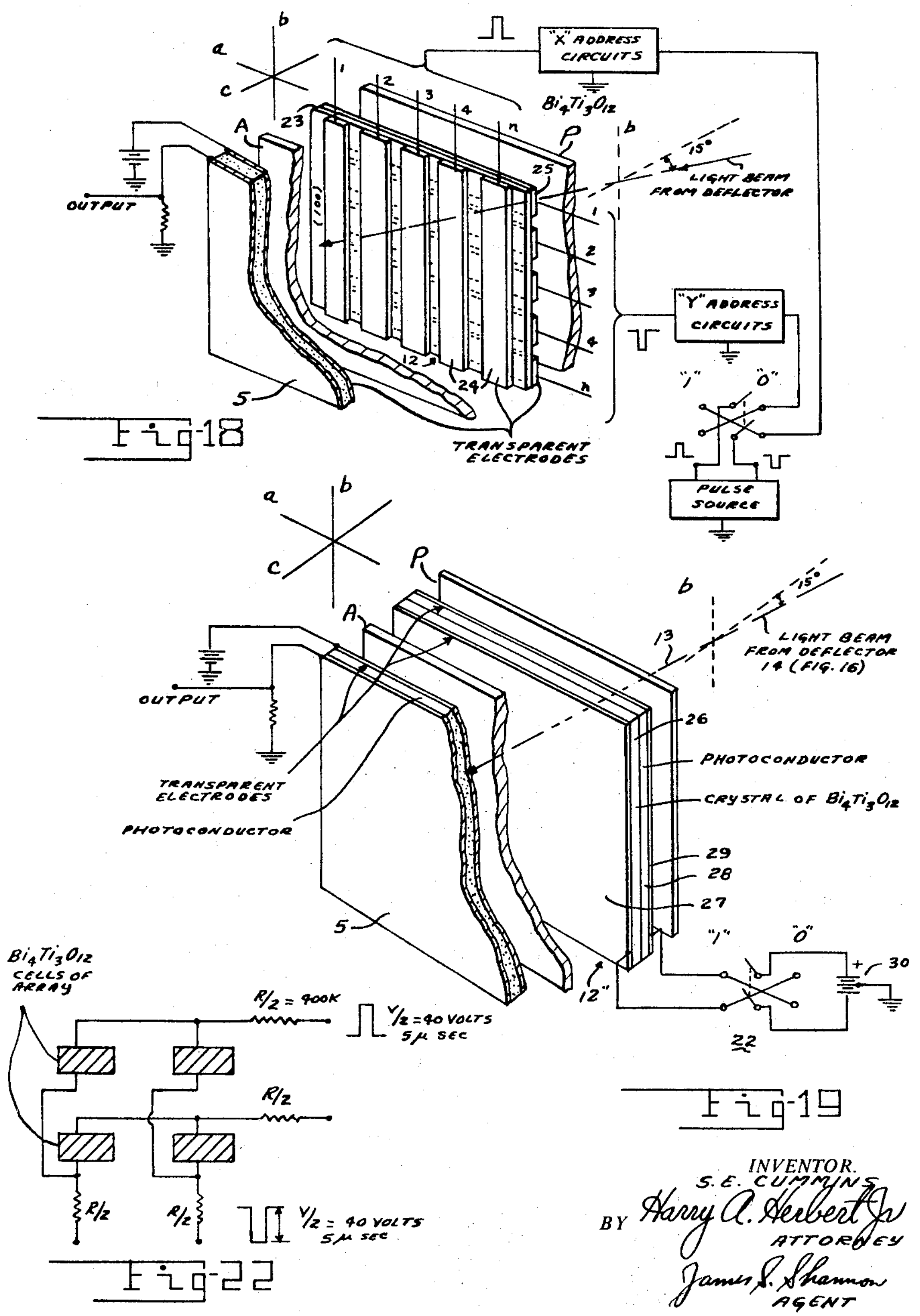
FIG. 18 shows the construction details of the array 12′ in FIG. 16.
FIG. 19 shows the construction details of another array 12″ having optical access for write-in that may be used in the system of FIG. 16.

In the array 12' of FIG. 16 the read-out method shown in FIG. 14 is employed. FIG. 16 is similar in all respects to FIG. 15 with the exception that the light beam makes an angle of 15° with respect to the normal to the array and to the major (001) face of the crystal as in FIG. 14. The construction of the array 12' is shown in FIG. 18. A single crystal 23 of $Bi_4Ti_3O_{12}$ has transparent vertical strip electrodes 24 and transparent horizontal strip electrode 25 applied to opposite major (001) faces. The elemental crystal areas situated between each overlap of the two electrode systems constitute an array of storage elements, each like that shown in FIG. 14. Write-in is accomplished in the same manner as for FIG. 17, only the crystal element situated between the vertical and horizontal strip electrodes selected by the "X" and "Y" address circuits receiving sufficient voltage to switch it from one of the stable polarization states shown in FIGS. 6 and 7 to the other.

Normally for the state selected to represent binary "0" the directions of crossed polarizers P and A in FIG. 18 are aligned for extinction, i.e. parallel to the axes of the indicatrix, so that beam 13 is blocked from reaching detector 5. Then for the other or binary "1" state the indicatrix is shifted about 2° from extinction, as explained for FIG. 14, permitting light to reach detector 5 and produce an output.

The array of FIG. 18 is somewhat easier to construct than that of FIG. 17 since the crystal plate 23 conforms to the natural principally two-dimensional growth habit of this material. However, the difference in extinction angles for the two stable states is not as great and this may require more precise optical adjustment.

FIG. 19 shows the construction details of a memory cell array 12'' which may be used in the information storage system of FIG. 16 and which permits optical access for write-in as well as for read-out. In this construction a $Bi_4Ti_3O_{12}$ crystal plate 26, similar to plate 23 in FIG. 18, has a transparent electrode 27 deposited on one major or (001) face and a layer of photoconductive material 28 deposited on the other (001) face. A second transparent electrode 29 is applied over the photoconductor. A voltage from source 30, may be applied between the electrodes through polarity reversing switch 22 or its electrical equivalent. Write-in is accomplished by positioning beam 13, through X–Y address information applied to beam deflector 14, to the desired spot on the array and applying a voltage of the proper polarity between electrodes 27 and 29. With the array shielded from light other than beam 13, conduction is established between electrode 29 and the crystal only at the elemental area of the array on which the beam falls and the information is stored only at that point. Optical read-out is accomplished in same manner as in FIG. 18.

Figure 20:
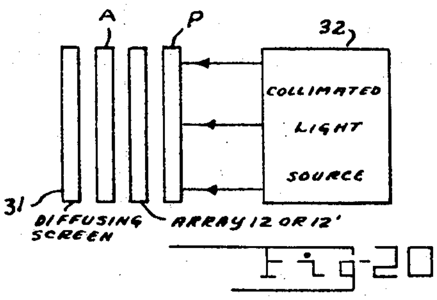
FIG. 20 shows the arrangement of a display panel using arrays as shown in FIG. 17 and FIG. 18.

The arrangements of FIGS. 15 and 16 may be converted into display panels for displaying picture information in the form of a pattern of bright and dark elemental areas or, in a manner that will be explained later, in shades of grey. For this purpose, as seen in FIG. 20, the light detector 5 is replaced by a diffusing screen 31 and the beam deflection system 14 is replaced by a collimated light source 32 for uniformly illuminating the entire active area of the array. With this arrangement, diffusing screen 31 displays the pattern of "1" and "0" or light and dark memory cells in the array.

In the arrays described above the switching charge applied to the individual $Bi_4Ti_3O_{12}$ memory cells was assumed to be sufficient to force saturation states in the crystal, i.e. to cause the entire crystal to be either in the "0" stable state as represented in FIG. 6 or the "1" stable state as represented in FIG. 7. This is proper for the storage of digital information. However, it is also possible to store analog information in the memory cell by a partial switching so that part of the cell area is in one of the two described stable states and the remainder in the other. This is accomplished by limiting the switching charge to a value less than the amount required to saturate the crystal. The amount of light transmitted by the cell then represents the value of the analog between 0 for zero light transmission and 1 for maximum light transmission.

Figure 21:
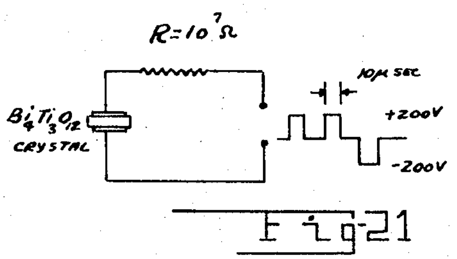
FIG. 21 shows a method of partially switching a $Bi_4Ti_3O_{12}$ memory cell for the storage of analog information.

FIG. 21 illustrates how a single memory cell of $Bi_4Ti_3O_{12}$ can be partially switched. Consider the specific example of a crystal having the following characteristics:

Thickness normal to *a-b* plane$=d=0.01$ cm.
Electrode area$=A=0.0005$ cm.$^2$
$E_c$ (coercive field)$=5$ kv./cm.
$V_c$ (min. switching voltage)$=E_c \cdot d=50$ volts.
$P_s$ (spontaneous polarization)$=4$ $\mu$c./cm.$^2$ In order to obtain controlled partial switching, constant current pulses of a fixed duration and either polarity can be used. The net spontaneous polarization state will then be dependent on the algebraic sum of the + and − current pulses. If $Q_T$ is the charge required to go from the saturated state of one polarity to the saturated state of the other polarity, then $$Q_T=2P_s \cdot A=0.004\ \mu c.$$

For 200 volt pulses $$i=\frac{200}{10^7}=20\times 10^{-6}\text{ amperes}$$

and the charge per pulse of 10 microsecond duration is $$Q_P=20\times 10^{-6}\times 10\times 10^{-6}=0.0002\ \mu c./\text{pulse}$$

and $$\frac{Q_T}{Q_P}=\frac{.004}{.0002}=20\text{ pulses}$$

to go from one saturated state to the other. In reading a cell partially switched in this manner the light varies from zero with the cell fully saturated in one stable state to maximum for full saturation in the other stable state.

Figure 23:
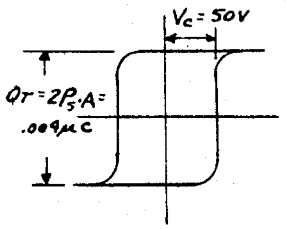
FIGS. 22 and 23 show the application of partial switching to a multicell array having coincident pulse access.

For partial switching of the individual cells in arrays using coincident pulse selection techniques, such as shown in FIGS. 17 and 18, the procedure illustrated in FIG. 22 may be used. Using a cell of the same dimensions as for FIG. 21, $Q_T=0.004$ $\mu$c. and $V_c=50$ volts. The total switching voltage V applied only to the cell where coincidence occurs is selected as 80 volts so that $V/2=40$ volts is less than the minimum switching voltage $V_c=50$ volts as seen in FIG. 23, and only the selected cell is affected. Assuming, in this case, ten 5 $\mu$sec. pulses for complete switching $$Q_P=\frac{0.004\ \mu c.}{10}=0.0004\ \mu c.$$

and $$i=\frac{Q_P}{t_P}=\frac{0.0004\times 10^{-6}}{5\times 10^{-6}}=0.8\text{ ma.}$$

so that $$R=\frac{80}{0.8\times 10^{-3}}=800,000\text{ ohms and } R/2=400,000\text{ ohms}$$

Using the above partial switching technique, the display panel arrangement may be made to show a range of grey tones for more accurate picture reproduction.

$Bi_4Ti_3O_{12}$ crystals may also be used in logic circuits. AND and OR gates may be constructed in the general manner shown in FIG. 24. Elements 33, 34 and 35 are $Bi_4Ti_3O_{12}$ memory cells having switching inputs A, B and C and oriented as in FIG. 9 or FIG. 14. These are placed in series between crossed polarizers P and A. It will be apparent that if one of these cells is out of extinction, i.e. is in the stable state in which the axes of the indicatrix are not parallel to the polarization directions of P and A, as in FIG. 7, light will reach detector 5. Therefore, for an AND gate, the extinction states of 33, 34 and 35 are defined as the "1" states and the absence of light at the detector equals "1." Consequently, three "1" inputs must have been applied to produce a "1" output. Otherwise, light reaches the detector indicating a "0" output. Therefore, if $A=1$ and $B=1$ and $C=1$, then $D=1$. For an OR gate, the "1" state of the cells is defined as the out of extinction state and the presence of light at the detector 5 is defined as representing a "1" output. Therefore, if $A=1$ or $B=1$ or $C=1$, then $D=1$.

I claim:

1. A bistable memory cell with electrical write-in and continuous nondestructive optical read-out comprising: a single crystal of the ferroelectric material $Bi_4Ti_3O_{12}$; first and second light polarizers having polarization directions at right angles; means for passing light through the first polarizer, the crystal and the second polarizer in succession in a direction normal to the *a* crystallographic axis and making an angle of less than 90° with the *b* axis; electrodes on said crystal for applying an electric field normal to the plane of the *a* and *b* crystallographic axes; means coupled to said electrodes for selectively applying an electric pulse of either polarity therebetween for inserting information into the memory device, said crystal being oriented relative to the directions of said polarizers for extinction when the electrical polarization of the crystal is that corresponding to an applied electric pulse of a predetermined polarity; and means for sensing light that has passed through the second polarizer.

2. Apparatus as claimed in claim 1 in which the charge represented by each pulse applied to said electrodes is sufficient to cause the electrical polarization to be the same throughout the entire crystal, for the write-in of binary digital information.

3. Apparatus as claimed in claim 1 in which the charge represented by each pulse applied to said electrodes is a fraction of the charge required to reverse the electrical polarization of the entire crystal, for the write-in of analog information.

4. An electrically controlled optical device comprising: a single crystal of the ferroelectric material $Bi_4Ti_3O_{12}$; first and second light polarizers having polarization directions at right angles; means for passing light through the first polarizer, the crystal and the second polarizer in succession in a direction normal to the *a* crystallographic axis and making an angle of less than 90° with the *b* axis; electrodes on said crystal for applying an electric field normal to the plane and the *a* and *b* crystallographic axes; and means coupled to said electrodes for selectively applying electric pulses of either polarity therebetween, said crystal being oriented relative to the directions of said polarizers for extinction when the electrical polarization of the crystal is that corresponding to an applied electric pulse of a predetermined polarity.

5. An electrically controlled optical device comprising: a single monoclinic crystal of a ferroelectric material in which the optical indicatrix has one of its three axes parallel to the *b* crystallographic axis, has two stable angular positions about the *b* axis less than 180° apart, and can be switched from either stable position to the other by the momentary application of an electric field normal to the plane of the *a* and *b* crystallographic axes; first and second light polarizers having polarization directions at right angles; means for passing light through the first light polarizer, the crystal and the second light polarizer in succession in a direction normal to the *a* crystallographic axis and making an angle of less than 90° with the *b* axis, the orientation of said crystal relative to the light polarization directions being such that the other two axes of the indicatrix are parallel to the light polarization directions in one of the stable positions of the indicatrix; and a pair of electrodes on said crystal for the momentary application of an electric field normal to the plane of the *a* and *b* crystallographic axes for switching the indicatrix from either of its stable positions to the other.

6. Apparatus as claimed in claim 5 in which means are provided for sensing light that has passed the second light polarizer.

7. A multicell memory system comprising: an array of memory cells made up of a plurality of similar long narrow parallel juxtaposed single crystals of $Bi_4Ti_3O_{12}$ with the faces parallel to the plane of the *a* and *c* crystallographic axes lying in a common plane, each crystal having a common electrode on one of two opposite faces parallel to the plane of the *a* and *b* crystallograph axes and on the other a plurality of electrically separate electrodes dividing the crystal into a column of similar memory cells, each memory cell having two stable electrical polarization states in which the optical indicatrix has different stable angular positions about the *b* axis to which axis one of the three axes of the indicatrix is parallel, and each memory cell being switchable for information write-in purposes from either of the two stable states to the other by the application of a voltage pulse of proper magnitude and polarity between the common and the separate electrodes; an electrical write-in circuit coupled to the individual electrodes of said array for selecting any desired memory cell and applying a write-in pulse thereto; first and second light polarizers having polarization directions at right angles to each other and parallel to the other two axes of the indicatrix in a predetermined one of the two stable positions of the indicatrix; optical read-out means for passing a beam of light in a direction parallel to the *b* axis through the first light polarizer, any selected memory cell of said array and the second light polarizer in succession; and means for sensing light that has passed said second polarizer.

8. A multicell memory comprising: a single crystal of $Bi_4Ti_3O_{12}$ having a set of transparent parallel juxtaposed strip electrodes on one of its major faces parallel to the plane of the *a* and *b* crystallographic axes and a similar set of transparent strip electrodes on the opposite major face at right angles to the first set, whereby the crystal elements between the strip crossings constitute an array of memory cells, each memory cell having two stable electrical polarization states in which the optical indicatrix has different stable angular positions about the *b* axis to which axis one of the three axes of the indicatrix is parallel, and each cell being switchable for information write-in purposes from either of the two stable states to the other by the application of a voltage pulse of the proper magnitude and polarity to the strip electrodes between which the cell lies; an electrical write-in circuit coupled to said two sets of electrodes for selecting any desired memory cell and applying a write-in pulse thereto; first and second light polarizers having polarization directions at right angles to each other and parallel to the other two axes of the optical indicatrix in a predetermined one of the two stable positions of the indicatrix; means for passing a beam of light in a direction normal to the *a* crystallographic axis and at an angle of approximately 15° to the normal to the plane of the *a* and *b* crystallographic axes through the first light polarizer, any selected memory cell of said array and the second light polarizer in succession; and means for sensing light that has passed through said second polarizer.

9. A multicell memory comprising: a multicell array made up of a single crystal of the ferroelectric material $Bi_4Ti_3O_{12}$ having a transparent electrode covering one of its two major faces parallel to the plane of the *a* and *b* crystallographic axes, a coating of a photoconductive material covering the other major face, and a transparent electrode covering and in contact with said photoconductive coating, said crystal having two stable electrical polarization states in which the optical indicatrix has different stable angular positions about the *b* axis to which axis one of the three axes of the indicatrix is parallel, and said crystal being switchable from either of the two stable states to the other by the momentary application of an electric field normal to the plane of the *a* and *b* axes; first and second light polarizers having polarization directions at right angles to each other and parallel to the other two axes of the optical indicatrix in a predetermined one of the two stable positions of the indicatrix; means for passing a beam of light in a direction normal to the *a* crystallographic axis and at an angle of approximately 15° to the normal to the plane of the *a* and *b* axes through the first light polarizer, any point on said array and said second light polarizer in succession; means for selectively applying a voltage of either polarity between said electrodes whereby an electric field is applied to said crystal at the point through which said beam is passing; and means for sensing light that has passed through said second polarizer.

10. A display panel comprising: an array of memory cells made up of a plurality of similar long narrow parallel juxtaposed single crystals of $Bi_4Ti_3O_{12}$ with the faces parallel to the plane of the *a* and *c* crystallographic axes lying in a common plane, each crystal having a common electrode on one of two opposite faces parallel to the plane of the *a* and *b* crystallographic axes and on the other a plurality of electrically separate electrodes dividing the crystal into a column of similar memory cells, each memory cell having two stable electrical polarization states in which the optical indicatrix has different stable angular positions about the *b* axis to which axis one of the three axes of the indicatrix is parallel, and each memory cell being switchable for information write-in purposes from either of the two stable states to the other by the application of a voltage pulse of proper magnitude and polarity between the common and the separate electrodes; an electrical write-in circuit coupled to the individual electrodes of said array for selecting any desired memory cell and applying a write-in pulse thereto; first and second light polarizers having polarization directions at right angles to each other and parallel to the other two axes of the indicatrix in a predetermined one of the two stable positions of the indicatrix; means for passing collimated light in a direction parallel to the *b* axis through the first light polarizer, the total area of said array and the second light polarizer in succession; and a diffusing screen positioned to receive the light that has passed through the second light polarizer.

11. A display panel comprising: a single crystal of $Bi_4Ti_3O_{12}$ having a set of transparent parallel juxtaposed strip electrodes on one of its major faces parallel to the plane of the *a* and *b* crystallographic axes and a similar set of transparent strip electrodes on the opposite major face at right angles to the first set, whereby the crystal elements between the strip crossings constitute an array of memory cells, each memory cell having two stable electrical polarization states in which the optical indicatrix has different stable angular positions about the *b* axis to which axis one of the three axes of the indicatrix is parallel, and each cell being switchable for information write-in purposes from either of the two stable states to the other by the application of a voltage pulse of the proper magnitude and polarity to the strip electrodes between which the cell lies; an electrical write-in circuit coupled to said two sets of electrodes for selecting any desired memory cell and applying a write-in pulse thereto; first and second light polarizers having polarization directions at right angles to each other and parallel to the other two axes of the optical indicatrix in a predetermined one of the two stable positions of the indicatrix; means for passing collimated light in a direction normal to the *a* crystallographic axis and at an angle of approximately 15° to the normal to the plane of the *a* and *b* crystallographic axes through the first light polarizer, the total area of said array and the second light polarizer in succession; and a diffusing screen positioned to receive the light that has passed through the second light polarizer.

12. A logic circuit comprising: a plurality of similarly oriented single crystals of the ferroelectric material $Bi_4Ti_3O_{12}$, each crystal having electrodes on its two major faces parallel to the plane of the *a* and *b* crystallographic axes, each having two stable electrical polarization states in which the optical indicatrix has different stable angular positions about the *b* axis to which axis one of the three axes of the indicatrix is parallel, and each being switchable from either of the stable states to the other by the application of a voltage pulse of the proper magnitude and polarity between said electrodes; first and second light polarizers having their polarization directions at right angles to each other and parallel to the other two axes of the indicatrix when said crystals are in the same predetermined one of the two electrical polarization states; means for passing light in succession through a cascade of elements consisting of the first light polarizer, said plurality of crystals and the second light polarizer in a direction normal to the *a* crystallographic axis and at an angle to the *b* crystallographic axis of less than 90°; a light detector for sensing light that has passed the second polarizer; individual input circuits coupled to the electrodes of each crystal; and an output circuit coupled to said light detector.

References Cited

UNITED STATES PATENTS

| | | | |
|---|---|---|---|
| 2,909,972 | 10/1959 | De Lano | 340—174.1 |
| 2,928,075 | 3/1960 | Anderson | 340—173.2 |
| 3,229,261 | 1/1966 | Fatuzzo | 340—173 |

TERRELL W. FEARS, *Primary Examiner*.